United States Patent [11] 3,549,157

[72] Inventor Gerd Von Bennigsen
    Geisenbrunn, Post Gilching, Germany
[21] Appl. No. 671,442
[22] Filed Sept. 28, 1967
[45] Patented Dec. 22, 1970
[73] Assignee Reinz Dichtungs-Gesellschaft mbH
    Neu-Ulm-Donau, Germany
    a company of Germany
[32] Priority Sept. 30, 1966
[33] Germany
[31] No. R44250

[54] JACKETED GASKET
    13 Claims, 10 Drawing Figs.
[52] U.S. Cl. .................................................. 277/231,
    277/233, 277/235
[51] Int. Cl. ...................................................... F16j 15/02
[50] Field of Search............................................ 277/229-
    —235, 235B; 92/169, 172, 277/(ATD); 92/(ATD)

[56] References Cited
    UNITED STATES PATENTS
1,779,616  10/1930  Oven .......................... 277/235BUX
1,846,402  2/1932   Oven .......................... 277/235BUX
2,249,127  7/1941   Goetze ........................ 277/231
2,766,055  10/1956  Poltorak ...................... 277/231X
    FOREIGN PATENTS
697,209   11/1964  Canada ........................ 277/234
278,223   10/1927  Great Britain ................ 277/235B Primary Examiner—Laverne D. Geiger
Assistant Examiner—Jeffrey S. Mednick
Attorneys—Erich M. Radde, Charles A. Mc Clure, Gerard J. Weiser and Alfred Stapler ABSTRACT: Jacketed gasket with at least one of its legs folded over for at the most half of its width, the fold being at a distance from the bend of the jacket which is at least equal to the thickness of the gasket in the noncompressed state.

Inserts, such as annular disks, washers, wires of metal and synthetic resin, or other plastic material may be inserted into the fold.

The gasket, after compression of its jacketed part has the advantage that no flowing out or squeezing out of the gasket material on compression or tightening of the gasket between the surfaces to be sealed can take place. Thus satisfactory sealing is guaranteed.

INVENTOR.
GERD VON BENNIGSEN

JACKETED GASKET

BACKGROUND OF THE INVENTION

The present invention relates to gaskets and more particularly to partly enclosed or edge jacketed gaskets, i.e. to gaskets of a relatively soft material the edge parts of which are provided with and embraced by a reenforcing jacket.

Sealing or packing sheets or gaskets consisting of a relatively soft material such as asbestos, preferably compressed asbestos, with natural or synthetic rubber as binder are jacketed and reenforced with jackets or borders preferably of sheet metal, especially at the edges which are exposed to considerable wear and tear. The jackets or borders increase the mechanical strength of such sheet gaskets and protect them against destructive and injurious effects.

Such borders or edge jackets are especially useful for packing sheets or gaskets consisting of plastic material or asbestos in mixture with suitable binders when serving for packing and sealing separating or parting joints or gaps. In such instances the borders or jackets exert not only a protective effect but they also improve local compressibility which can be adjusted within a wide range by varying the thickness of the bordering or jacketing sheet metal and the width of the jacket or border.

When exposed to higher temperature, sheet gaskets or sealing and packing sheets composed, for instance, of asbestos and a binder, for instance, a synthetic resin, natural or synthetic rubber, and the like have the tendency to flow and to be squeezed out of the border or jacket area due to the high compression pressure. As a result thereof the material forming the jacketed sheet gasket, for instance, plastic or the asbestos mixture is squeezed out and flows out of the jacket. Due thereto the pressure on compressing the jacket and gasket is reduced to such an extent that proper sealing of the joint, for instance, against gases cannot be achieved with certainty.

Many attempts have been made to overcome these and other disadvantages such as the flowing out of the sealing and packing material of the packing and/or destruction of the gasket or packing sheet. But they did not yet meet with success.

SUMMARY OF THE INVENTION

It is one object of the present invention to provide a gasket or packing sheet which is free of the disadvantages of the heretofore known gaskets or packing sheets and which has a number of additional advantages.

Other objects of the present invention and advantageous features thereof will become apparent as the description proceeds.

In principle the gasket according to the present invention is characterized by having at least one leg or extension of the border or jacket folded over and thus doubling the thickness of the jacket. However, the folded over part of the leg should cover the remaining part of the leg only for a relatively small distance, i.e. not more than for about one-half, and preferably for about one-third to one-fourth of the width of the leg thus leaving part of said leg uncovered by the folded portion of the leg. Folding is effected at a distance from the bend of the jacket which is at least equal to the thickness of the gasket in the noncompressed state.

The leg or extension of the border or jacket on the opposite side of the gasket may be folded over in the same manner and at the same distance from the bend of the jacket to the front edge of the folded part of the other leg or, respectively, to its rear edge or therebetween. Preferably the unfolded leg on the opposite side of the gasket extends to about the middle or center line of said folded part of the other leg. In this manner squeezing out or flowing out of the gasket material within the area of the bordering or jacketing sheet metal is completely prevented or at least kept in permissible limits.

Regardless whether the sheet metal border or jacket is folded on both sides or only on one side of the gasket, the effect is achieved that the clamping or compressing pressure causes upsetting compression or, respectively, pinching or squeezing together of the gasket material so that it cannot run out of the jacket. As a result thereof an undesired detrimental decrease in clamping or compression pressure is avoided.

The material used for bordering or jacketing the gasket may be any conventionally used bordering sheet metal, such as iron or soft sheet, stainless steel, Monel Metal, aluminum, copper, zinc, nickel, lead, and others. It may also be plastic material such as polytetrafluoro ethylene. Especially suitable have proved deep-drawing sheet metal or respectively, rigid, non-deforming synthetic resin, the shape of which is not affected by increased temperature.

Suitable resilient and relatively soft gasket materials are, for instance, asbestos which may be compressed and/or impregnated with suitable binder material such as natural or synthetic rubber, synthetic resins, and the like materials. Said binders may contain conventional filler materials. The gasket material may be reenforced, for instance, by a preferably perforated sheet metal insert, a wire web, a web of wires and asbestos filaments, and the like. All such known soft and resilient packing or gasket materials, even if as such not yielding and not having the tendency to flow, do become plastic, or do yield under the clamping or compression pressure and at increased temperature so that they flow out or are squeezed out of the jacketed or bordered area of the gasket or that they yield and thus decrease the packing and sealing effect. Such flowing and yielding is prevented, at least to a large extent, by the present invention.

The jacketing or bordering sheet metal or plastic may be folded, or laid over, outwardly or inwardly.

According to an advantageous embodiment of the present invention inserts may be provided and inserted into the fold or, respectively, into one of the folds or in both folds, if present. Said inserts are composed of noncompressible material, if it is desired to increase the clamping or compression pressure upon the jacketed part of the gasket. They may also consist of a flowable material, for instance, of a flowable synthetic resin, if additional microsealing is required. The inserts may also have the form of discs or flanges, of rings, of wires and the like and may consist, for instance, of metal or of synthetic resin. The inserts permit additional variations in the distribution of the clamping or compression pressure exerted on the jacketed part of the gasket. If such inserts are of plastic material, they cause better filling out and, as a result thereof, better sealing of the tool marks and grooves caused by machining and tooling the jacketing sheet metal. At the same time they increase the clamping pressure.

BRIEF DESCRIPTION OF THE DRAWINGS

The attached drawings illustrate various embodiments of the present invention. In said drawings.

In said drawings like index numerals indicate like parts of the jacketed gaskets.

DETAILED DESCRIPTION OF INVENTION

Figure 1:
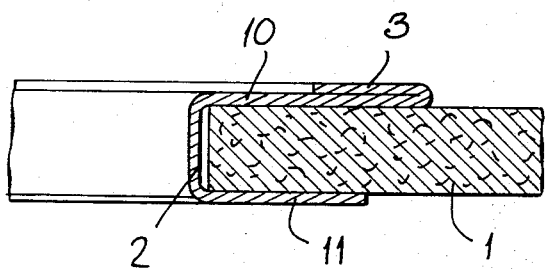
FIGS. 1 and 2 are cross-sectional views of the edge part of gaskets according to the present invention having only one leg of the jacket folded over.

In FIG. 1 there is shown gasket 1 consisting of compressed asbestos with binder. Said gasket is jacketed at its edge by deep-drawing sheet iron enclosing and reenforcing the edge portion of the gasket on both its upper and its lower surface. Upper extension or leg 10 of jacket 2 is folded over outwardly and forms outward fold 3. As is evident, said outward fold 3 is about half as wide as upper leg or flange 10 of jacket 2. It ends at a distance from the bend of jacket 2 corresponding to about the thickness of gasket 1. Lower leg or flange 11 of jacket 2 ends at a distance about half the width of upper fold 3.

Figure 2:
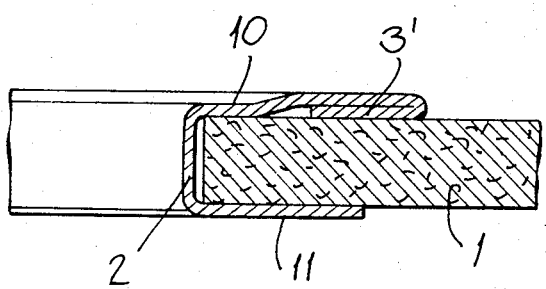

FIG. 2 shows the same jacketed gasket 1 whereby folded part 3' of upper leg 10 is folded inwardly.

Figure 3:
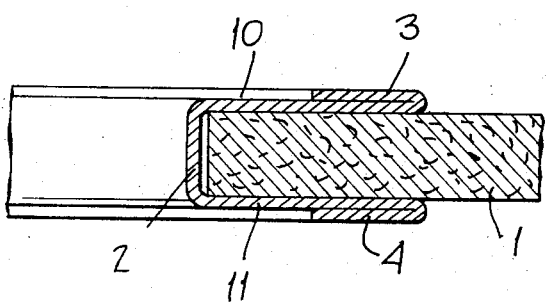
FIGS. 3 and 4 are cross-sectional views of gaskets having both legs folded over.

In FIG. 3 extensions or legs 10 and 11 of jacket 2 are folded over outwardly on both sides of gasket 1. Folds 3 and 4 have a width corresponding to about the thickness of gasket 1 and end at a distance from the points at which jacket 2 is bent around gasket 1 corresponding to about the thickness of gasket 1.

Figure 4:
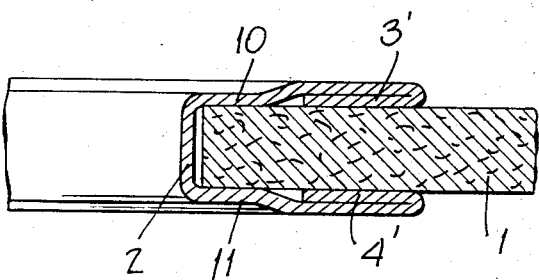

FIG. 4 shows the same jacketed gasket 1 whereby folded parts 3' and 4' at the upper and lower surface of said gasket 1 are folded inwardly. In FIGS. 3 and 4 the distance of folds 3 and 4 or, respectively, 3' and 4' from the points at which jacket 2 is bent around gasket 1 is about the same.

Figure 5:
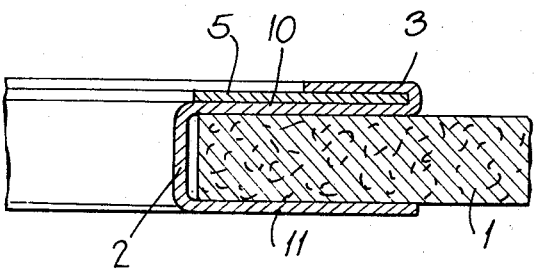
FIGS. 5 to 8 are cross-sectional views of jacketed gaskets with inserts into the folded part or parts of the jacket.

FIG. 5 shows a jacketed gasket in which annular disc or spacing washer 5 is inserted into the fold between leg 10 and folded part 3. Said annular disc is not as wide as gasket 1 and ends before the point at which jacket 2 is bent around said gasket 1. Lower leg 11 of jacket 2 extends as far as the fold of upper leg 10 but is not folded.

Figure 6:
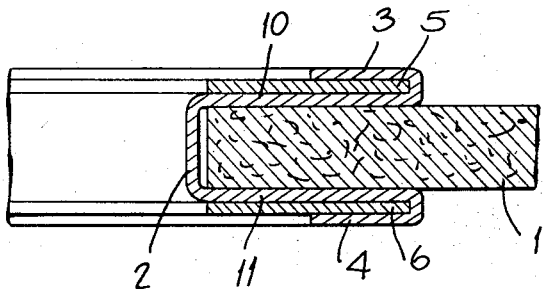

FIG. 6 shows a similar embodiment of the present invention as illustrated in FIG. 5 whereby both legs 10 and 11 of jacket 2 are folded to form folds 3 and 4 any whereby annular discs 5 and 6 are inserted into the folds.

Figure 7:
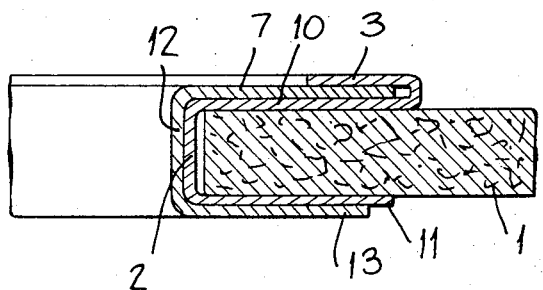

FIG. 7 illustrates an embodiment of this invention wherein not only jacket or bordering flange 2 is bent around gasket 1 but also insert 12 which is inserted with its leg 7 between upper leg 10 and folded part 3 of jacket 2 and is bent outwardly of and around jacket 2 with its lower leg 13 covering leg 11 thereof.

Figure 8:
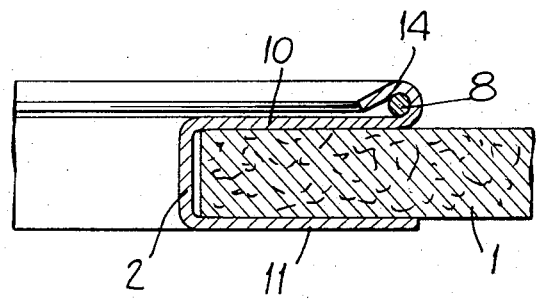

In FIG. 8 upper leg 10 of jacket 2 is bent around wire insert 8 and forms loop 14.

Figure 9:
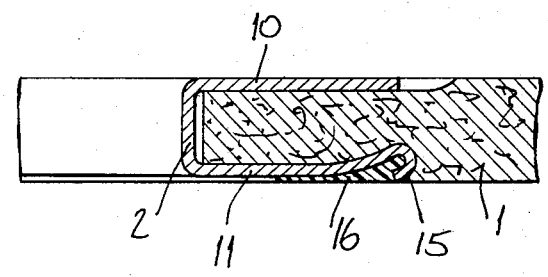
FIGS. 9 and 10 are cross-sectional views of folded jackets having inserts of plastic material.

FIG. 9 shows gasket 1 after compression with lower folded loop 15 extending from lower leg 11 of jacket 2. Upper leg 10 is not folded. Compressible plastic material 9 is inserted in loop 15. It is partly squeezed out therefrom on compression and thus covers and seals the turning grooves or tool marks which might be present in lower leg 10.

Figure 10:
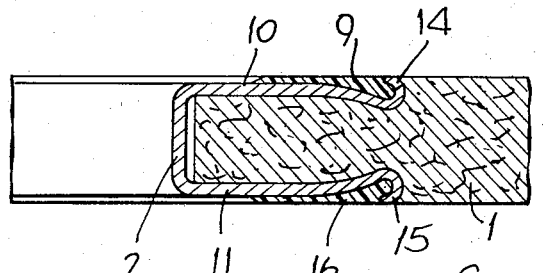

FIG. 10 shows a gasket 1 in which loops 14 and 15 are provided on upper and lower legs 10 and 11 of jacket 2. Said loops are filled up with plastic inserts 9 and 16 which are partly squeezed out on compressing the finished edge-jacketed gasket.

In place of compressed asbestos there may be employed other gasket material with or without binder, such as white asbestos millboard, woven asbestos fabric, white asbestos fabric with copper or brass wire reenforcing inserts. Leather, flax or jute, cotton fabric, wool in the form of felt, cork, paper, polytetrafluoro ethylene, polyethylene, and other gasket materials may be also be used.

I place of deep-drawing sheet iron, there may be used other metals for edge-jacketing or bordering the gasket such as aluminum, copper, soft steel, Monel Metal, lead, zinc, nickel and other or synthetic resins such as polytetrafluoro ethylene and others.

The binder material may be natural or synthetic rubber, neoprene, butyl rubber, chlorinated rubber, polyvinylchloride, and others Gaskets according to the present invention have proved to be especially suitable as cylinder head gaskets. They may, of course, also be used for other packing and sealing purposes, for instance, for boiler handholes and manholes, reaction vessels, column stills, and in general for any inclusion between rigid parts of a fluid container in essentially stationary relationship to prevent or stop leakage. I claim:

1. A flat gasket comprising a gasket of compressible material having an exposed edge and a jacket of substantially noncompressible material and folded around said exposed edge and jacketing the adjacent edge portion of said compressible material gasket, said jacket having a bottom leg underlying said gasket material and a top leg overlying said gasket material, the free end of a least one of said legs being reverse folded back into juxtaposition with the unfolded portion thereof to define a double-thickness jacket area, the line of said back fold being a distance from the edge-covering bend of said jacket which distance is at least equal to the thickness of said gasket material in its noncompressed state, the reverse folded portion of said leg covering no more than one half of the length of the unfolded portion thereof.

2. The jacketed gasket of claim 1, wherein the reverse folded portion of said folded leg covers from one-fourth to one-third of the length of the unfolded portion thereof.

3. The jacketed gasket of claim 1, wherein the free ends of both legs are reverse folded into juxtaposition with the unfolded portion thereof.

4. The jacketed gasket of claim 1, wherein the free end of said one leg is reverse folded into juxtaposition with the unfolded portion thereof and wherein the length of said other leg extends about to the plane of the reverse fold line of said reverse folded leg.

5. The jacketed gasket of claim 1, wherein the free end of said one leg is reverse folded into juxtaposition with the unfolded portion thereof and wherein the length of said other leg extends about to the plane of the free end of the reverse folded portion of said reverse folded leg.

6. The jacketed gasket of claim 1, wherein the free end of said one leg is reverse folded into juxtaposition with the unfolded portion thereof and wherein the length of said other leg extends about to the plane of the middle of the reverse folded portion of said reverse folded leg.

7. The jacketed gasket of claim 1, in which the free end of said one leg is reverse folded outwardly.

8. The jacketed gasket of claim 1, in which the free end of said one leg is reverse folded inwardly.

9. The jacketed gasket of claim 1, wherein said compressible material is asbestos.

10. The jacketed gasket of claim 1, wherein said compressible material is asbestos having a binder material incorporated therein.

11. The jacketed gasket of claim 1, wherein said compressible material is reenforced asbestos.

12. The jacketed gasket of claim 1, wherein said jacket is formed from sheet metal.

13. The jacket gasket of claim 1, wherein said jacket is formed from a rigid plastic material capable of retaining its shape when subjected to an increase in temperature.

PO-1050
(5/69)

UNITED STATES PATENT OFFICE
CERTIFICATE OF CORRECTION

Patent No. 3,549,157    Dated December 22, 1970

Inventor(s) Gerd von Bennigsen

It is certified that error appears in the above-identified patent and that said Letters Patent are hereby corrected as shown below:

Column 3, line 24: The word "any" should read -- and --; column 3, line 52: The words "I place" should read -- In place --; column 3, line 59: A period -- . -- should be inserted after "others"; column 4, line 8: The numeral -- 1. -- should be inserted before "A".

SIGNED AND
SEALED
MAR 9 1971

(SEAL)
Attest:

Edward M. Fletcher, Jr.
Attesting Officer

WILLIAM E. SCHUYLER,
Commissioner of Pat